INVENTORS.
JOHN F. DISCH.
RUDOLPH KOSACH.
BY Joseph B. Lindecker.
ATT'Y.

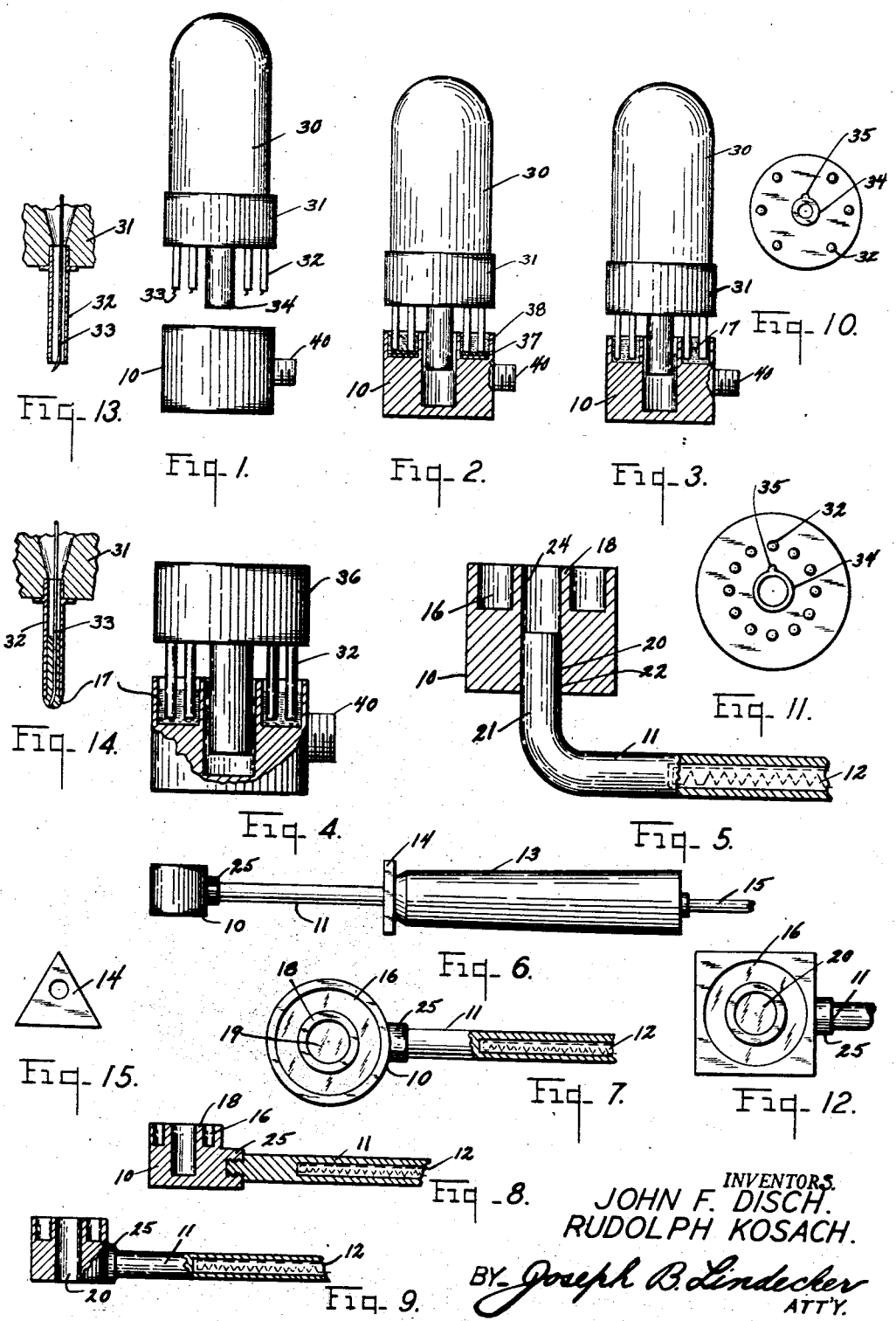

Patented Aug. 18, 1942

2,293,455

UNITED STATES PATENT OFFICE 2,293,455

DEVICE FOR APPLYING SOLDER

John Francis Disch and Rudolph Kosack, Chicago, Ill.

Application September 17, 1941, Serial No. 411,180

4 Claims. (Cl. 219—26)

The invention relates to flux-coating, tinning or soldering devices of the type in which a reservoir is employed for holding a quantity of liquid flux, or melted tin, or melted solder, and in which the objects to be flux-coated, tinned or soldered are dipped.

The invention further relates to an improved tool for heat conditioning and applying molten solder for bonding or soldering electrical connections to terminals of plugs and sockets commonly used in electrical work.

The principal object of the invention is to provide a molten solder reservoir adapted for the soldering of wires or electrical connections to terminals of polarized and non-polarized type plugs and sockets commonly used in radio work and cable work, these plugs all being provided with terminals and one or more positioning prongs of any type and of any desired configuration.

Another object of the invention is to provide a heated reservoir and more particularly to an improved construction of body adapted to be used as an attachment for a universal type soldering iron which can be heated in any desired manner for melting solder and/or other metals.

Another object of the invention is to provide a reservoir of improved construction adapted to be used as a tool and to be constructed in such a manner as to be effective in quickly melting solder or other metal placed therein, when placed upon, or secured to, any heating unit especially those deriving their energy from electricity, gas, oil, chemical compounds or any other suitable means.

Another object of the invention is to provide a molten solder reservoir in the soldering tip of an electric soldering-iron, adapted for the soldering of wires to terminals of polarized and non-polarized type plugs and sockets and the like, by immersion in the reservoir containing the solder at proper service temperature; said iron being provided with a housing for an electrical heating element and other necessary electrical circuit conductors so it may be used in places otherwise quite inaccessible.

Another object of the invention is to provide novel material reservoir part of the improved tool, which may be ladle shaped, or cup shaped, or of any other suitable shape depending upon the nature of the work in connection with which the tool is to be used.

Another object of the invention relates to a method and means of applying the necessary chemical solution and/or any other type of flux-coating to electrical connections by immersion of said connections prior to soldering the electrical connections also by immersion of said connections in a novel reservoir containing molten solder, and it has special reference to novel heating devices associated therewith.

Further objects and advantages are within the scope of this invention such as relate to the arrangement, operation and function of the related elements of the structure, to various details of construction and to combination of parts, elements per se, and to economies of manufacture and numerous other features as will be apparent from a consideration of the specification and the accompanying drawings of preferred embodiments of the invention, in which, however, modifications may be made without departing from the scope of the appended claims.

Figure 1 is a side view of a radio tube, and a soldering pot of our invention illustrating the position of the same before they are applied to each other for the soldering of the terminal pins;

Figure 2 is a view similar to Figure 1 showing the pot in section for clearness with soldering flux in the reservoir and the radio tube terminals immersed therein;

Figure 3 is a view similar to Figure 2 with the pot shown in section, the reservoir containing molten solder and the radio tube terminals immersed therein;

Figure 4 is an enlarged fragmentary sectional view of a soldering pot of our invention with the terminal pins of an amphenol plug immersed in molten solder retained in the reservoir of said pot;

Figure 5 is a fragmentary sectional view of a soldering pot of our invention showing a modified form of handle shank having a bore in axial alignment with the base of said pot and containing a heating element therein;

Figure 6 is an elevation of an electrically heated tool embodying our invention;

Figure 7 is an enlarged fragmentary plan view of the pot or tip end of the tool shown in Figure 6;

Figure 8 is a side view shown in section of the pot or tip end of the tool shown in Figure 6;

Figure 9 is a view similar to Figure 8 with a modified form of pot;

Figure 10 is a bottom view of a radio tube;

Figure 11 is a bottom view of an "Amphenol" plug;

Figure 12 is a plan view similar to Figure 7 with a modified type or modified shape of soldering pot;

Figure 16:
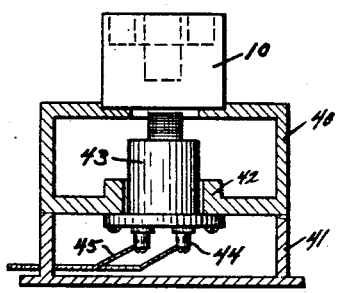
Figure 17:
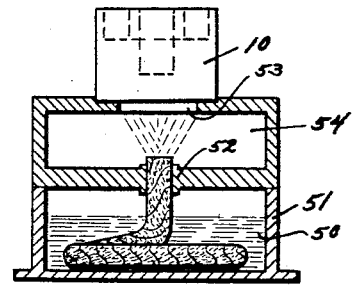
Figure 18:
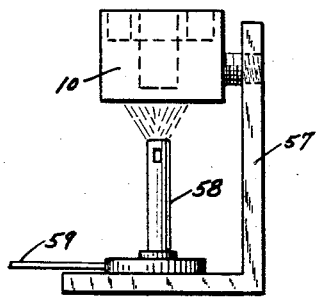
Figure 19:
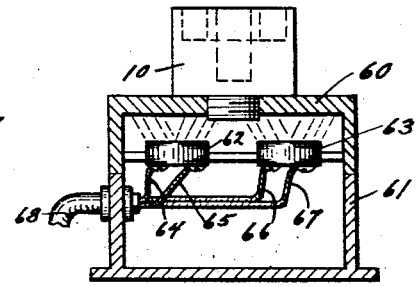
Figure 20:
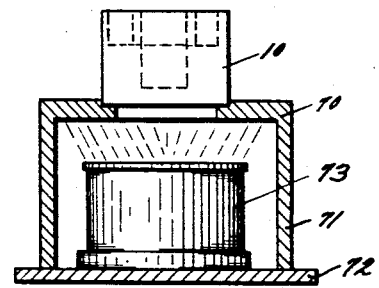

Figure 13 is a fragmentary vertical section thru a terminal pin of a radio tube, as shown in Figure 1, prior to soldering;

Figure 14 is a view similar to Figure 13, showing a terminal tip after it has been immersed in solder;

Figure 15 is an elevational view of an insulating washer suitably shaped to form a supporting means;

Figure 16 is a side view of our novel soldering pot placed upon a support, said support shown in section and supporting an electrical heating element positioned below said pot;

Figure 17 is a view similar to Figure 15 showing a fuel oil container with a wick positioned below the pot;

Figure 18 is a side view of our invention secured to an angle bracket support and having a Bunsen type gas burner positioned therebelow;

Figure 19 is a side view of our invention positioned upon an electric stove;

Figure 20 is a view similar to Figure 18 showing the heat being supplied by "canned heat."

Referring now to the drawings, the construction illustrated in the drawings includes, and referring specifically to Figures 6 and 7, we have the metallic soldering pot 10, preferably of copper, having secured thereto the metallic bar 11, said bar having assembled therein an electrical heating element 12, said bar being assembled in a suitable handle 13, with a washer 14 of heat insulating material which is clamped between the end of the grip section of the handle and the metal bar 11 when the parts are first assembled, said washer shielding the hand from the heat of the pot or tip end and so shaped to form a support for said device, said pot 10 in bar 11 being heated by electric current passing through the cable 15 to the heating element 12 positioned in said bar. The pot 10 is formed as a hollow extension or from a metal block with an open channel shaped groove, or melting reservoir 16 therein, said reservoir adapted to contain the flux or molten solder 17, said solder being heated by convection through the bar 11 and base of pot 10, said pot 10 having a central bore therein forming with the inner peripheral wall of said reservoir a central tubular shaft having a stem 18, said shaft being open at the top and closed at the bottom. The open bore of said stem providing a dry chamber 19 for preventing molten solder coming into contact with positioning prongs on radio tubes and the like when the terminal ends of said tubes are immersed in the molten solder 17 as featured by our novel soldering device. The base of the pot 10 and the triangular shaped washer 14 each have a flat surface thereon for maintaining the reservoir in a proper upright position when either one or the entire device is placed upon a flat surface; said washer 14 being so designed as to keep the pot 10 elevated and in upright position when the handle 13 is resting upon the same surface as said washer.

The modification shown in Figure 9 illustrates a metallic pot with a bore 20 open at the top and at the bottom thereof.

The modification shown in Figure 5 illustrates the pot 10 assembled with a horizontal bar 11, said bar bent at an angle upwardly, forming a vertical supporting means 21, the solid upper end 22 being secured within the lower portion of bore 20 open at the top and at the bottom in said pot 10, said end 22 thereby closing the bore 20 at the base thereof and forming a shaft open only at the top. The upper surface of said pot 10 being provided with a groove 16 forming the channel shaped reservoir and forming in conjunction with the bore 20 and the inner wall 24 a tubular stem 18. This type construction eliminates the necessity of an integrally formed hollow threaded lug or bar extension 25 as shown in the figures described above.

In Figure 1 is shown a radio tube 30 with base 31 and hollow terminals 32. Electrical connections or wires 33 are shown extending outwardly therefrom, this feature being more clearly shown in Figure 13. Said tube 30 is shown having a hollow positioning prong 34 centrally positioned wtih respect to the outer periphery of its base as is clearly shown in Figure 10, said prong 34 being provided with a laterally-projecting rib 35 disposed on one side thereof.

In Figures 4 and 11 is shown an "Amphenol" plug 36 with numerous terminal pins, a positioning prong, and parts similar to the terminals on said radio plugs 30, so like numerals have been designated thereto for simplicity.

In Figure 2 a radio tube 30 is shown with terminals immersed in reservoir 16 of pot 10. The reservoir herein is shown with a piece of felt 37 positioned in the bottom thereof, the reservoir being filled with a soldering flux 38 to prepare the electrical connections 33 and terminals 32 for the solder necessary to bond the wires 33 and terminals 32 together as a unit.

In Figure 3 a radio tube 30 is shown with its wires and terminals immersed in molten solder 17, the solder bonding said wires 33 and terminals 32 together as is clearly shown in Figure 14.

In Figures 1, 2, 3 and 4, a solid externally screw-threaded lug 40, is shown integrally formed on the side of the melding pot 10 and positioned a short distance above the bottom of the same for the attachment of any type handle.

The modification shown in Figure 12 illustrates a pot 10 assembled with bar 11, said pot being formed from a cubical shaped bar of metal provided with a bore 20 and a reservoir 16 for the purpose set forth.

When it is desired to use our novel soldering pot as a stationary unit on a bench or the like, for dipping the terminals of plugs, sockets, or the like, in molten solder contained in the reservoir of said stationary pot, said pot may be heated by various methods, as for example, those shown in Figures 16, 17, 18, 19 and 20.

In Figure 16 our pot 10 is shown supported upon a table 40 provided with legs 41 and a hub 42, in which an electric heating coil type unit 43 is mounted, being provided with binding screws 44 to receive the supply wires 45.

In Figure 17 our novel pot 10 is shown supported upon a fuel container 50, provided with side walls 51, and a central hub 52, thru which a wick is extended. The top surface of said container has an opening 53 therein and in conjunction with the upper section of said container 50, forms a combustion chamber 54 for suitable liquid fuel 56, as for example, fuel oil, alcohol or the like, to heat said pot.

In Figure 18 our novel pot 10 is shown supported by an angle bracket 57 and positioned to receive heat from the combustion of gas by the use of a Bunsen type gas burner 58, being supplied with gas thru tube 59.

In Figure 19 our novel pot 10 is shown supported by an electric stove 60 provided with legs 61 and heating units 62 and 63, said units being provided with supply wires 64, 65, 66, 67 contained in cable 68.

In Figure 20 our novel pot 10 is shown supported upon a stand 70, provided with legs 71 and base 72, suitably arranged to support a can of commercial compound, 73, such as "Canned Heat" or the like, in the base thereof, said compound when ignited will heat said pot 10 to melt solder contained therein.

In operation, when electrical connections and terminals of radio tubes, sockets, or the like are to be soldered together, a pot constructed as described above is filled with liquid flux and said terminals of said tubes are dipped into the flux either by lowering the tube and terminals or raising the pot into contact therewith, as desired. The terminals are then removed and dipped into another pot, such as pot 10 containing molten solder 17, said pot receiving heat from any desired source and in any desired manner; the molten solder adhering to the wires and terminals and after removal of the terminals from the solder in the reservoir of the pot, the solder remaining on said terminals will harden and form a perfect bond.

From the foregoing description of the few specific forms of the present invention, it becomes evident that it may find many uses, particularly in the electric wiring business; that its construction eliminates all danger of fire hazards; and that a good many variations may be provided in order to enhance the quality of, and to adapt the device for various specific purposes and uses; and it is thought that a clear understanding of the construction, utility and advantages of our invention will be had without a more detailed description thereof. We desire, therefore, that the appended claims shall be accorded the broadest construction consistent with their language and the prior art.

What we claim is:

1. A hand tool of the kind described, comprising a one piece metallic body portion and handle extension, said body capable of receiving heat having a central bore providing a hollow shaft, the top surface of said body provided with a channel shaped groove surrounding said shaft to form a solder melting pot where a plurality of terminals of a single electrical plug may be dipped for soldering at one dipping while the positioning prong of said plug is positioned within the hollow shaft.

2. A hand tool of the kind described, comprising a cylindrical metallic body portion capable of receiving heat, the bottom of said body being formed to rest or be secured upon a supporting surface, the top of said body provided with a circular, channel shaped, groove providing a reservoir for soldering material, and said body also provided with a central hollow shaft open at its top; whereby a plurality of electrical connections may be soldered at the same time to a plurality of terminals of an electrical plug having a positioning prong by immersing said connections and terminals in the solder and placing the prong inside the hollow shaft.

3. A soldering device comprising an open hollow melting chamber of integrally formed bounding walls and provided with a hollow shaft-like member protruding from one of its inside surfaces, said shaft-like member providing a dry well to receive a positioning prong of a plug which is not to receive solder, said shaft-like member surrounded by a channel shaped reservoir arranged to receive the terminals of a plug to which the solder is to be applied, and heating means arranged therewith to apply heat to said reservoir to melt solder inserted therein.

4. A soldering device for soldering a plurality of terminals on a plug and the like comprising an open hollow melting chamber of integrally formed bounding walls and provided with a vertical hollow shaft-like member protruding upwardly from its inside bottom surface, said shaft-like member providing a dry well to receive a positioning prong of a plug which is not to receive solder, said shaft-like member surrounded by a channel shaped reservoir arranged to receive a plurality of terminals of a plug to which the solder is to be applied, and heating means arranged therewith to apply heat to said reservoir to melt solder inserted therein.

JOHN FRANCIS DISCH.
RUDOLPH KOSACK.

CERTIFICATE OF CORRECTION.

Patent No. 2,293,455.  August 18, 1942.

JOHN FRANCIS DISCH, ET AL.

It is hereby certified that error appears in the above numbered patent requiring correction as follows: In the grant, lines 1 and 13, and in the heading and signature to the printed specification, name of second inventor, for "Rudolph Kosack" read --Rudolph Kosach--; and that the said Letters Patent should be read with this correction therein that the same may conform to the record of the case in the Patent Office.

Signed and sealed this 20th day of October, A. D. 1942.

(Seal)

Henry Van Arsdale,
Acting Commissioner of Patents.